US012750793B2

(12) United States Patent
Zhu et al.

(10) Patent No.: US 12,750,793 B2
(45) Date of Patent: Sep. 29, 2026

(54) TECHNIQUES FOR SWITCHING RECEIVE BEAMS FOR CELL MEASUREMENT IN WIRELESS COMMUNICATIONS

(71) Applicant: QUALCOMM Incorporated, San Diego, CA (US)

(72) Inventors: Jun Zhu, San Diego, CA (US); Ruhua He, San Diego, CA (US); Mihir Vijay Laghate, San Diego, CA (US); Yong Li, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/012,722

(22) Filed: Sep. 4, 2020

(65) Prior Publication Data

US 2022/0078726 A1 Mar. 10, 2022

(51) Int. Cl.
*H04W 56/00* (2009.01)
*H04B 17/336* (2015.01)
(Continued)

(52) U.S. Cl.
CPC ........ *H04W 56/001* (2013.01); *H04B 17/336* (2015.01); *H04W 24/10* (2013.01); *H04W 72/046* (2013.01); *H04W 72/30* (2023.01)

(58) Field of Classification Search
CPC . H04W 56/001; H04W 24/10; H04W 72/005; H04W 72/046; H04B 17/318; H04B 17/336
See application file for complete search history.

(56) References Cited

U.S. PATENT DOCUMENTS 9,876,549 B2 * 1/2018 Yu .......................... H04B 7/061
10,277,349 B1 4/2019 Kotecha et al.
(Continued)

FOREIGN PATENT DOCUMENTS

EP 2988431 A1 2/2016
WO 2015176684 A1 11/2015
(Continued)

OTHER PUBLICATIONS

ERICSSON: "On CSI-RS for Beam Management", 3GPP TSG-RAN WG1 #89, 3GPP Draft, R1-1708702, 3rd Generation Partnership Project (3GPP), France, pp. 1-6, May 14, 2017 (May 14, 2017), XP051273885, Retrieved from the Internet: URL: http://www.3gpp.org/ftp/Meetings_3GPP_SYNC/RAN1/Docs/ [retrieved on May 14, 2017] paragraphs [0002], [02.1], figure 1.
(Continued)

*Primary Examiner* — Deepa Belur
(74) *Attorney, Agent, or Firm* — ArentFox Schiff LLP

(57) ABSTRACT

Aspects described herein relate to receiving, from a base station, a transmit beam including a synchronization signal block (SSB) of multiple broadcast signals transmitted over multiple symbols, wherein receiving the transmit beam includes switching among multiple receive beams for each of the multiple symbols to receive a corresponding broadcast signal of the multiple broadcast signals, measuring a signal metric of each of the multiple broadcast signals as received via a corresponding receive beam of the multiple receive beams in a corresponding symbol of the multiple symbols, and selecting, based on the signal metric measured for each of the multiple broadcast signals, a receive beam of the multiple receive beams for communicating with the base station.

18 Claims, 5 Drawing Sheets

(51) Int. Cl.
*H04W 24/10* (2009.01)
*H04W 72/044* (2023.01)
*H04W 72/30* (2023.01)

(56) References Cited

U.S. PATENT DOCUMENTS

| | | | | |
|---|---|---|---|---|
| 10,652,893 | B2 | 5/2020 | Sadiq et al. | |
| 10,979,979 | B1 | 4/2021 | Kong et al. | |
| 11,006,304 | B2 * | 5/2021 | Yiu | H04B 7/0408 |
| 11,165,487 | B2 * | 11/2021 | Zhang | H04B 7/2656 |
| 11,184,789 | B2 | 11/2021 | Seo | |
| 11,206,167 | B1 | 12/2021 | Zhang et al. | |
| 2015/0244432 | A1 | 8/2015 | Wang | |
| 2018/0323926 | A1 * | 11/2018 | Cezanne | H04B 7/088 |
| 2019/0028244 | A1 * | 1/2019 | Si | H04W 72/042 |
| 2019/0288757 | A1 | 9/2019 | Zhou et al. | |
| 2019/0356379 | A1 * | 11/2019 | Takeda | H04B 7/0834 |
| 2020/0014430 | A1 | 1/2020 | Zhang | |
| 2020/0015239 | A1 | 1/2020 | Guey et al. | |
| 2020/0028560 | A1 | 1/2020 | Gao | |
| 2020/0037269 | A1 | 1/2020 | Ryu | |
| 2020/0076491 | A1 * | 3/2020 | Zhang | H04B 7/0628 |
| 2020/0154424 | A1 * | 5/2020 | Mondal | H04L 5/0048 |
| 2020/0162954 | A1 * | 5/2020 | Seo | H04W 56/001 |
| 2020/0295896 | A1 * | 9/2020 | Xiong | H04L 27/2636 |
| 2020/0374725 | A1 * | 11/2020 | Chen | H04L 5/0051 |
| 2021/0136703 | A1 * | 5/2021 | Kundargi | H04W 72/23 |
| 2021/0136823 | A1 * | 5/2021 | Kim | H04W 74/0891 |
| 2021/0168784 | A1 * | 6/2021 | Jung | H04W 72/51 |
| 2021/0235456 | A1 * | 7/2021 | Xu | H04L 5/003 |
| 2021/0400677 | A1 * | 12/2021 | Lee | H04L 5/005 |
| 2022/0095127 | A1 * | 3/2022 | Tang | H04L 5/0098 |
| 2022/0141676 | A1 | 5/2022 | Wang | |
| 2022/0231741 | A1 * | 7/2022 | Xiao | H04B 7/0626 |
| 2022/0278885 | A1 * | 9/2022 | Deng | H04W 56/001 |
| 2022/0286187 | A1 * | 9/2022 | Deenoo | H04L 5/0055 |
| 2023/0198597 | A1 * | 6/2023 | Zhou | H04W 36/26 |
| 2023/0199584 | A1 | 6/2023 | Xu et al. | |
| 2024/0357522 | A1 | 10/2024 | Zhu et al. | |

FOREIGN PATENT DOCUMENTS

| | | | |
|---|---|---|---|
| WO | 2019099148 | A1 | 5/2019 |
| WO | 2020164115 | A1 | 8/2020 |

OTHER PUBLICATIONS

Intel Corporation: "On Beam Management Overhead and Latency Reduction", 3GPP TSG RAN WG1 Meeting #94, 3GPP Draft, R1-1808719 On Beam Management Overhead and Latency Reduction, 3rd Generation Partnership Project (3GPP), 5 Pages, Aug. 11, 2018 (Aug. 11, 2018), XP051516093.

International Search Report and Written Opinion—PCT/US2021/042080—ISA/EPO—dated Nov. 8, 2021.

Apple Inc: "On Beam Management Enhancement", 3GPP TSG-RAN WG1 Meeting #102-e, R1-2006499, e-Meting, Aug. 17, 2020-Aug. 28, 2020, Aug. 8, 2020, 10 Pages.

Intel Corporation: "On Beam Management Overhead and Latency Reduction", 3GPP TSG-RAN WG1 Meeting #102-e, R1-1808719, Gothenburg, Sweden, Aug. 20, 2018-Aug. 24, 2018, Aug. 11, 2018, pp. 1-5.

Ericsson: "On CSI-RS for Beam Management", 3GPP TSG-RAN WG1 #89, R1-1708702, Hangzhou, China, May 15, 2017-May 19, 2017, May 6, 2017, pp. 1-6.

* cited by examiner

TECHNIQUES FOR SWITCHING RECEIVE BEAMS FOR CELL MEASUREMENT IN WIRELESS COMMUNICATIONS

BACKGROUND

Aspects of the present disclosure relate generally to wireless communication systems, and more particularly, to switching beams for cell measurement.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. In 5G NR, base stations and user equipment (UEs) can beamform antenna resources to generate beams for transmitting and/or receiving wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication is provided. The method includes receiving, from a base station, a transmit beam including a synchronization signal block (SSB) of multiple broadcast signals transmitted over multiple symbols, wherein receiving the transmit beam includes switching among multiple receive beams for each of the multiple symbols to receive a corresponding broadcast signal of the multiple broadcast signals, measuring a signal metric of each of the multiple broadcast signals as received via a corresponding receive beam of the multiple receive beams in a corresponding symbol of the multiple symbols, and selecting, based on the signal metric measured for each of the multiple broadcast signals, a receive beam of the multiple receive beams for communicating with the base station.

In another example, an apparatus for wireless communication is provided that includes a transceiver, a memory configured to store instructions, and one or more processors communicatively coupled with the memory and the transceiver. The one or more processors are configured to receive, from a base station, a transmit beam including a SSB of multiple broadcast signals transmitted over multiple symbols, wherein receiving the transmit beam includes switching among multiple receive beams for each of the multiple symbols to receive a corresponding broadcast signal of the multiple broadcast signals, measure a signal metric of each of the multiple broadcast signals as received via a corresponding receive beam of the multiple receive beams in a corresponding symbol of the multiple symbols, and select, based on the signal metric measured for each of the multiple broadcast signals, a receive beam of the multiple receive beams for communicating with the base station.

In a further example, an apparatus for wireless communication is provided that includes means for receiving, from a base station, a transmit beam including a SSB of multiple broadcast signals transmitted over multiple symbols, wherein the means for receiving the transmit beam includes means for switching among multiple receive beams for each of the multiple symbols to receive a corresponding broadcast signal of the multiple broadcast signals, means for measuring a signal metric of each of the multiple broadcast signals as received via a corresponding receive beam of the multiple receive beams in a corresponding symbol of the multiple symbols, and means for selecting, based on the signal metric measured for each of the multiple broadcast signals, a receive beam of the multiple receive beams for communicating with the base station.

In another example, a computer-readable medium including code executable by one or more processors for wireless communications is provided. The code includes code for receiving, from a base station, a transmit beam including a SSB of multiple broadcast signals transmitted over multiple symbols, wherein the code for receiving the transmit beam includes code for switching among multiple receive beams for each of the multiple symbols to receive a corresponding broadcast signal of the multiple broadcast signals, measuring a signal metric of each of the multiple broadcast signals as received via a corresponding receive beam of the multiple receive beams in a corresponding symbol of the multiple symbols, and selecting, based on the signal metric measured for each of the multiple broadcast signals, a receive beam of the multiple receive beams for communicating with the base station To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
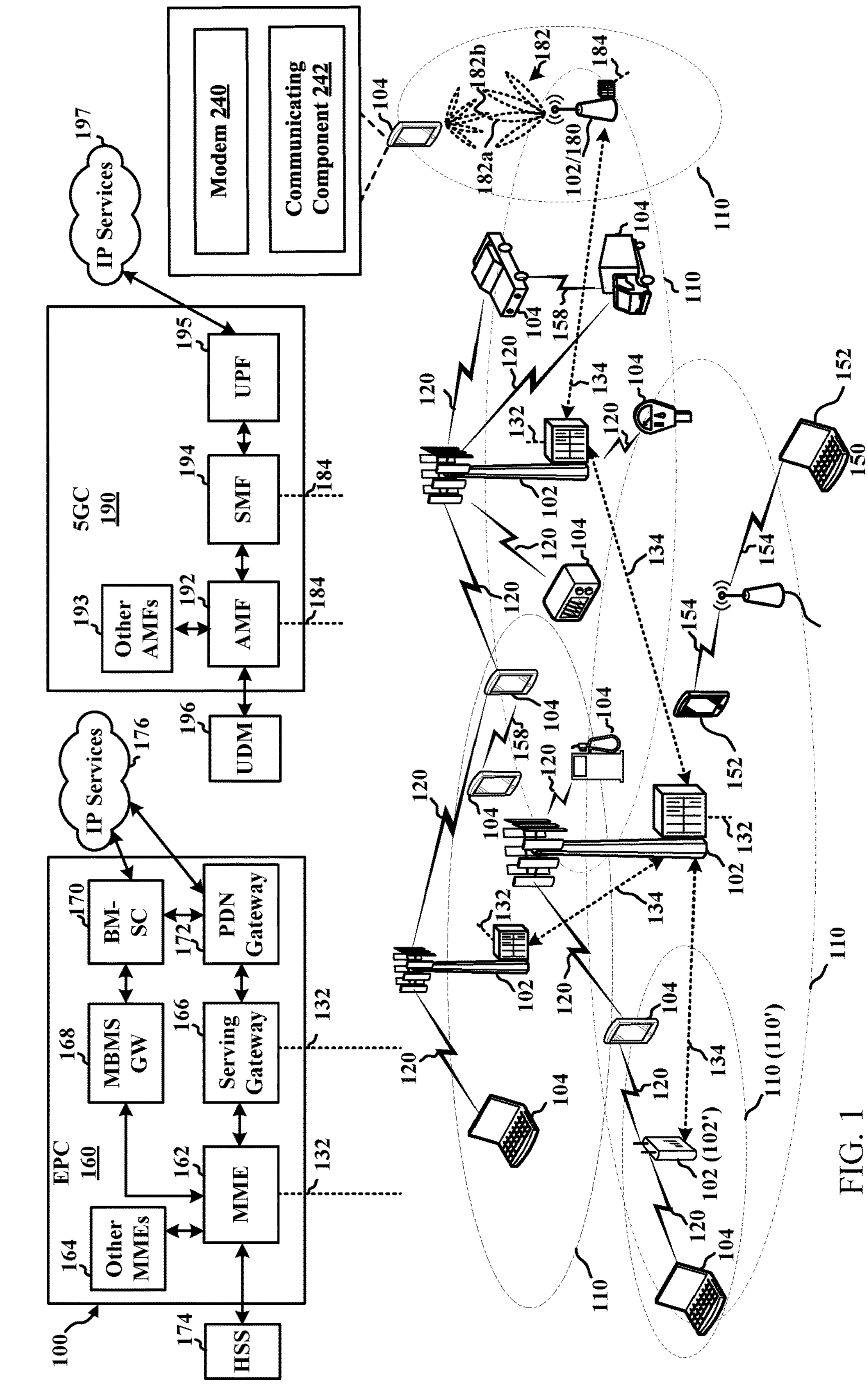
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to measuring, by a first device (e.g., a user equipment (UE)), signals transmitted based on one or more transmit beams as received from a second device (e.g., a base station) based on multiple receive beams at the first device. For example, the devices can generate the beams by beamforming multiple antenna resources to achieve a spatial direction of energy for transmitting or receiving wireless communications. In order to combat high propagation loss in high frequency band, fifth generation (5G) new radio (NR) millimeter wave (mmW) communications, for example, can use a pair of base station (e.g., gNB) beam and UE beam to form a beam pair link between base station and UE, which carries control and data channels. As spatially directional beams (both base station and UE) may be sensitive to mobility—UE can do beam tracking in an attempt to stay on the best (e.g., most desirable) beam pair link for 5G high-speed communication. At the base station side, 5G mmW base station periodically broadcasts synchronization signal burst sets (SSBS), which sweeps all base station beam directions based on transmitting a synchronization signal block (SSB) in each direction. At UE side, UE can use different UE beams to measure on each gNB beam to assure signal quality.

In examples described herein, the first device can switch among the multiple receive beams on a per symbol basis to receive multiple broadcast signals that are beamformed using a given transmit beam from the second device. For example, a symbol can include an orthogonal frequency division multiplexing (OFDM) symbol or other symbol defined in a radio access technology for wireless communications, such as fifth generation (5G) new radio (NR). The second device can transmit a SSB of the multiple broadcast signals (e.g., a primary synchronization signal (PSS), secondary synchronization signal (SSS), primary broadcast channel (PBCH), etc.) in each of multiple symbols where the SSB and associated broadcast signals are beamformed based on a given transmit beam (e.g., based on the same beamforming of antenna resources at the second device). The first device can switch its receive beam (e.g., switch configuration of antenna resources to beamform in different spatial directions) to receive each of the multiple broadcast signals associated with the transmit beam based on multiple receive beams.

The received signals can be measured to determine a desired receive beam to use in communications between the first device and the second device. In addition, in an example, received signals can be measured for multiple transmit beams in this regard to determine a transmit beam and receive beam pair to use in communications between the first device and the second device. This can be part of a beam training procedure where the second device transmits signals based on multiple transmit beams for the purpose of the first device receiving the signals via each of multiple receive beams to determine the desired transmit beam and receive beam pair. Switching receive beams on a per symbol basis can improve efficiency of the beam training procedure by requiring less time to receive the multiple transmitted beams or less instances of the multiple transmitted beams to be transmitted, as the first device can measure multiple symbols of the transmit beam using different receive beams (as opposed to requiring separate transmit beams or SSBs to be transmitted for each receive beam).

The described features will be presented in more detail below with reference to FIGS. 1-5.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for performing per symbol switching of a receive beam for receiving transmit beams from a base station 102, in accordance with aspects described herein. Though a UE 104 is shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Though base station 102 and mmW base station 180 are separately shown, aspects described herein with respect to a base station 102 can relate to, and be implemented by, a mmW base station 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 of a UE 104 can receive signals based on one or more transmit beams from a base station 102, and can perform switching of a receive beam of the UE 104 per symbol, or at least using two or more different receive beams for two or more consecutive symbols of the transmit beam, to receive different signals that are based on a single transmit beam using different receive beams in the symbols. Communicating component 242, in an example, can measure the different signals to determine a desirable receive beam for the transmit beam. In addition, in an example, communicating component 242 can perform similar switching of the receive beam in receiving signals transmitted based on other transmit beams from the base station to determine a desirable transmit beam and receive beam pair. Communicating component 242 can use the determined receive beam for determining beamforming for communicating with the base station 104, and/or the base station 102 can use the determined transmit beam from the transmit beam and receive beam pair to determine beamforming communicating with the UE 104.

Figure 2:
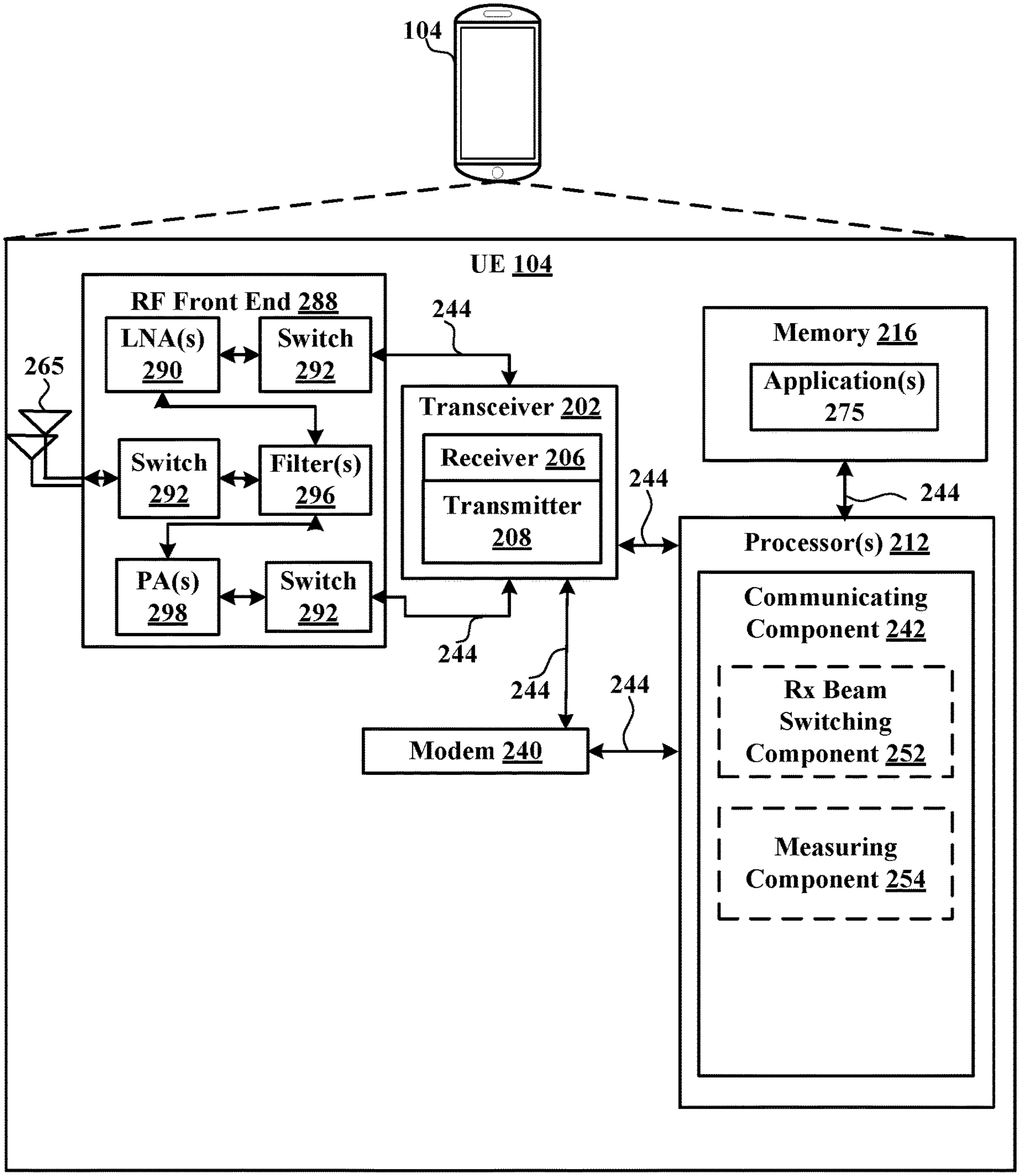
FIG. 2 is a block diagram illustrating an example of a UE, in accordance with various aspects of the present disclosure.
Figure 3:
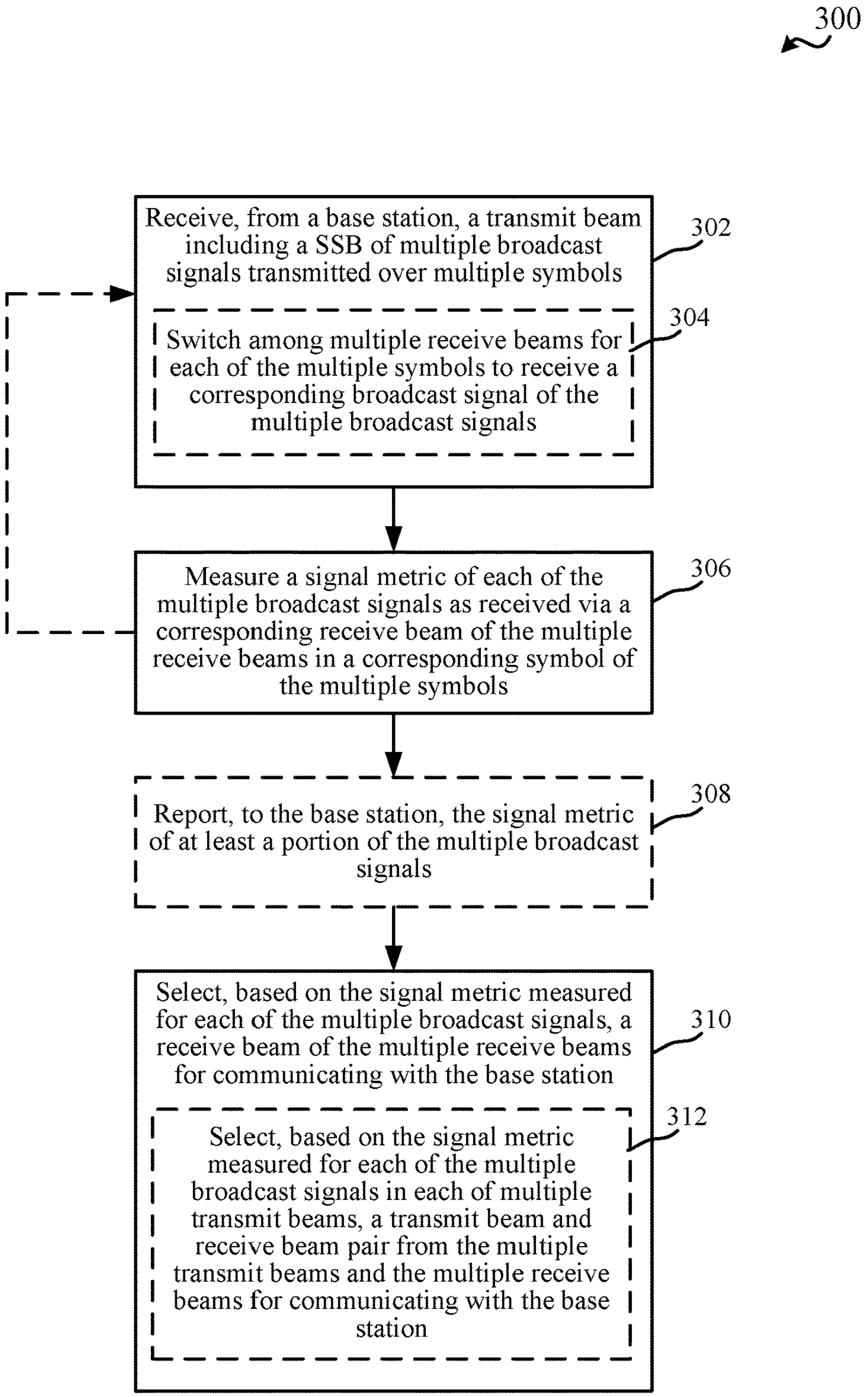
FIG. 3 is a flow chart illustrating an example of a method for switching receive beams per symbol to receive a transmit beam, in accordance with various aspects of the present disclosure.

Turning now to FIGS. 2-5, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for performing per symbol switching of a receive beam for receiving transmit beams from a base station, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a Rx beam switching component 252 for switching among multiple receive (Rx) beams at the UE 104, and/or a measuring component 254 for measuring signals based on one or more transmit beams that are received via the multiple receive beams and/or reporting a measurement result of the signals to a base station, in accordance with aspects described herein.

In an aspect, the processor(s) 212 may correspond to one or more of the processors described in connection with the UE in FIG. 5. Similarly, the memory 216 may correspond to the memory described in connection with the UE in FIG. 5.

FIG. 3 illustrates a flow chart of an example of a method 300 for determining at least a receive beam for communicating with a base station, in accordance with aspects described herein. In an example, a UE 104 can perform the functions described in method 300 using one or more of the components described in FIGS. 1 and 2.

In method 300, at Block 302, a transmit beam including a SSB of multiple broadcast signals transmitted over multiple symbols can be received from a base station. In an aspect, communicating component 242, e.g., in conjunction with processor(s) 212, memory 216, transceiver 202, etc., can receive, from the base station (e.g., base station 102), the transmit beam including the SSB of multiple broadcast signals transmitted over multiple symbols. For example, a SSB can include a collection of broadcast signals and/or channels, which may each occupy a symbol (e.g., an OFDM symbol). As such, for example, the transmit beam may occupy multiple symbols, which can include a signal transmitted based on the transmit beam, such as the SSB, occupying the multiple symbols. For example, a SSB may include a PSS, SSS, one or more PBCHs, etc., and in one specific example, a SSB may include a PSS, PBCH, SSS, PBCH in each of four consecutive symbols, where the consecutive symbols may be defined as being adjacent in a time domain. In one example, communicating component 242 can receive the SSB as part of SSBS where the base station 102 can transmit the SSB multiple times using different transmit beams created based on beamforming antenna resources at the base station 102 to achieve different spatial directions for the transmit beams. In one example, the SSBS may include up to 64 SSBs (e.g., for millimeter wave (mmW) communications) and may be transmitted in an SSBS duration (e.g., 5 milliseconds (ms)) over a time period (e.g., 20 ms), and may be repeated in each time period.

Conventionally, UEs can measure the SSBs transmitted in the SSBS duration using a single receive beam for the SSBS duration, and thus measuring for each receive beam of the UE can require multiple SSBS durations over multiple associated time periods. In particular, when measuring SSBSs using a single receive beam, up to X number of beam cycles can be required to get all beam pair links measured in a serving cell, where X can be equal to a number of UE receive beams. In addition, in mobility, the UE uses the serving cell RSRP to determine the transmit beam and receive beam pair switch, and delay of measurements in this regard may lead to radio link failure. Aspects described herein relate to switching the receive beam per symbol and/or per broadcast signal in a given SSB to allow measurement of a single SSB (transmitted based on a single transmit beam) based on multiple receive beams. This can decrease the SSBS durations required to measure signals related to each transmit beam and receive beam pair, and thus can decrease the overall time required to measure all transmit beam and receive beam pairs, as described further herein.

In receiving the transmit beam at Block 302, optionally at Block 304, multiple receive beams can be switched among for each of the multiple symbols to receive a corresponding broadcast signal of the multiple broadcast signals. In an aspect, Rx beam switching component 252, e.g., in conjunction with processor(s) 212, memory 216, transceiver 202, communicating component 242, etc., can switch among multiple receive beams for each of the multiple symbols to receive the corresponding broadcast signal of the multiple broadcast signals. For example, Rx beam switching component 252 can switch the receive beams by switching a beamforming matrix, or other indication of power to apply to multiple antenna resources of the UE 104, to achieve a different spatial direction. For example, Rx beam switching component 252 can switch the receive beams, such as those shown in receive directions 182*b* in FIG. 1. As described, for example, Rx beam switching component 252 can switch receive beams per symbol or otherwise such that the receive beam is switched multiple times for a given SSB transmitted using a given transmit beam. In an example, Rx beam switching component 252 can switch among receive beams defined or configured for use by the UE 104.

In addition, in an example, switching the receive beams may include determining a subset of the receive beams defined or configured for use by the UE 104 (e.g., a subset of beams that are spatially close to a current beam, such as a number n of the spatially closest beams in either direction, as these beams may be more likely desirable for update based on mobility of the UE 104). In this example, Rx beam switching component 252 can switch among the subset of receive beams. For example, Rx beam switching component 252 can select the number n of beams based on a number of symbols used to transmit the SSB according to the transmit beam to be measured (e.g., 4 symbols in examples described further herein).

Figure 4:
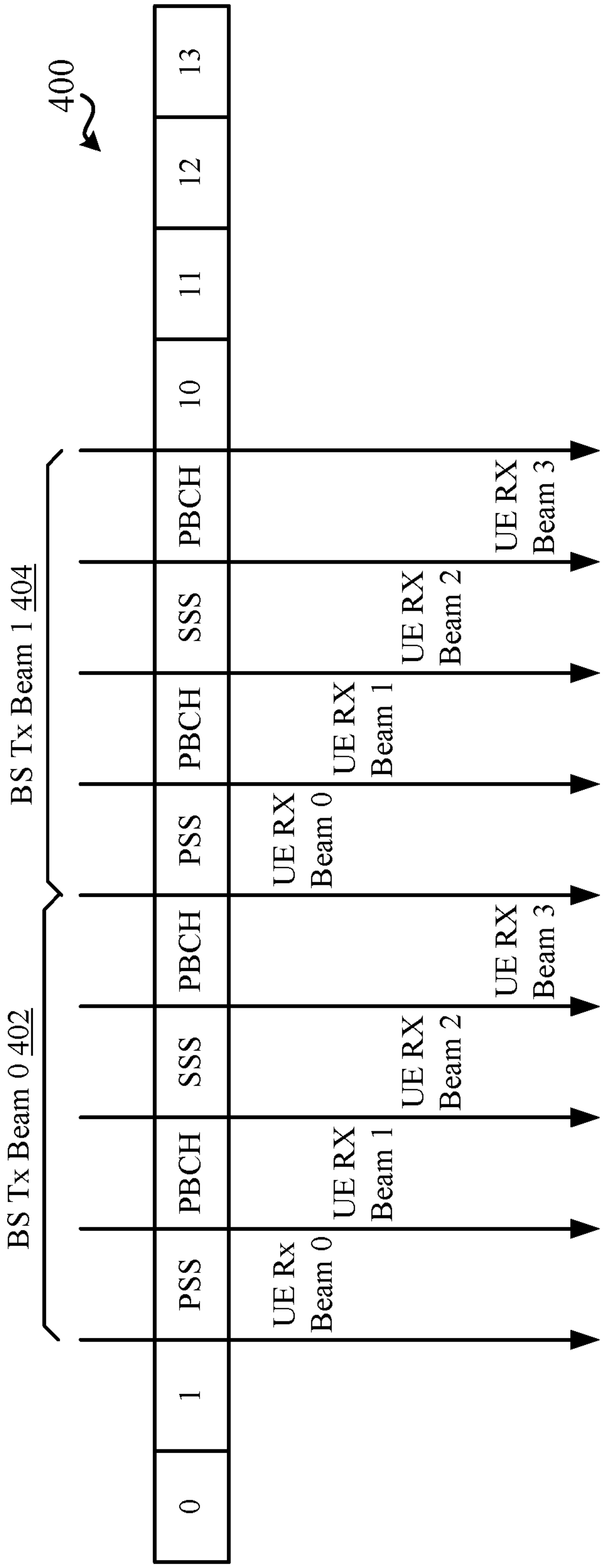
FIG. 4 illustrates an example of a collection of symbols over which a transmit beam is transmitted, in accordance with various aspects of the present disclosure.

An example is shown in FIG. 4, which illustrates a collection of symbols 400 during which a base station (BS) transmit (Tx) beam 0 402 and a BS Tx beam 1 404 are received. Each of BS Tx Beam 0 402 and BS Tx Beam 1 404 can have broadcast signals of a PSS, PBCH, SSS, PBCH transmitted in each of four consecutive symbols. Rx beam switching component 252 of a UE 104 can switch its receive beam in each symbol, among UE Rx Beam 0, UE Rx Beam 1, UE Rx Beam 2, UE Rx Beam 3, to respectively receive the PSS, PBCH, SSS, and PBCH of a single SSB, transmitted based on a single transmit beam, using different receive beams. As described further herein, the UE can measure each broadcast signal received using the different receive beams to determine a signal metric for each broadcast signal, being based on the same transmit beam, based on each receive beam. In this example, after receiving the last broadcast signal (PBCH) of BS Tx Beam 0 402, Rx beam switching component 252 can switch the receive beam from UE Rx Beam 3 back to UE Rx Beam 0 to receive the first broadcast signal (PSS) of BS Tx Beam 1 404.

In method 300, at Block 306, a signal metric of each of the multiple broadcast signals as received via a corresponding receive beam of the multiple receive beams in a corresponding symbol of the multiple symbols can be measured. In an aspect, measuring component 254, e.g., in conjunction with processor(s) 212, memory 216, transceiver 202, communicating component 242, etc., can measure a signal metric of each of the multiple broadcast signals as received via the corresponding receive beam of the multiple receive beams in the corresponding symbol of the multiple symbols. For example, measuring component 254 can measure a reference signal received power (RSRP), reference signal received quality (RSRQ), received signal strength indicator (RSSI), signal-to-noise ratio (SNR), or signal-to-interference-and-noise ratio (SINR) of each of the multiple broadcast signals as received via the corresponding receive beam. The signal metric can be used to determine which receive beam to use in communicating with the base station 102 (e.g., the receive beam having the highest signal metric).

In one example, the method 300 can proceed from Block 306 back to Block 302 to receive and process another transmit beam by switching the multiple receive beams per symbol, as described above. In this example, measuring the signal metric at Block 306 can include measuring the signal metrics for each received broadcast signal based on each receive beam and for each of multiple transmit beams. This can facilitate determining a desired transmit beam and receive beam pair (e.g., based on determining the receive beam related to each transmit beam that has the highest signal metric). In this regard, for example, receiving the transmit beam can include receiving, from the base station, multiple transmit beams including the SSB of the multiple broadcast signals transmitted over additional multiple symbols, and switching among the multiple receive beams for each of the multiple additional symbols to receive the corresponding broadcast signal of the multiple broadcast signals for each of the multiple transmit beams, and measuring the signal metric can include measuring the signal metric of each of the multiple broadcast signals as received via the corresponding receive beam of the multiple receive beams in the corresponding symbol of the multiple symbols in each of the multiple transmit beams.

Referring to the example of the collection of symbols 400 in FIG. 4, communicating component 242 can receive the BS Tx Beam 0 402 based on Rx beam switching component 252 switching among UE Rx Beams 0-3, and measuring component 254 can measure the signal metric for each signal as received on each of the UE Rx Beams 0-3. Then communicating component 242 can receive the BS Tx Beam 1 404 based on Rx beam switching component 252 switching among UE Rx Beams 0-3, and measuring component 254 can measure the signal metric for each signal as received on each of the UE Rx Beams 0-3. The various signal metrics can be evaluated to select a transmit beam and receive beam pair (e.g., a transmit beam for the base station 102 to use, which can be indicated as BS Tx Beam 0 402 or BS Tx Beam 1 404, and a receive beam for the UE 104 to use in receiving communications transmitted by the base station 102, which may include one of UE Rx Beam 0-3).

In method 300, optionally at Block 308, the signal metric of at least a portion of the multiple broadcast signals can be reported to the base station. In an aspect, measuring component 254, e.g., in conjunction with processor(s) 212, memory 216, transceiver 202, communicating component 242, etc., can report, to the base station, the signal metric of at least the portion of the multiple broadcast signals. For example, measuring component 254 can report all signal metrics to the base station 102, only signal metrics that achieve a threshold, etc. In addition, for example, measuring component 254 can indicate a transmit beam and a receive beam (e.g., by beam index, which can be configured at the UE 104 and base station 102) to identify to which beam or beam pair the signal metric relates. In this example, where the UE 104 reports the signal metrics to the base station 102, the base station 102 may choose the transmit beam and/or the receive beam and can configure the UE 104 to accordingly switch beams.

In method 300, at Block 310, a receive beam of the multiple receive beams can be selected, based on the signal metric measured for each of the multiple broadcast signals, for communicating with the base station. In an aspect, communicating component 242, e.g., in conjunction with processor(s) 212, memory 216, transceiver 202, etc., can select, based on the signal metric measured for each of the multiple broadcast signals, the receive beam of the multiple receive beams for communicating with the base station. For example, communicating component 242 can select the receive beam based on determining that the receive beam has a highest signal metric. In another example, communicating component 242 can select the receive beam based on reporting the signal metrics to the base station 102 and receiving an indication from the base station 102 of which receive beam to select.

In selecting the receive beam at Block 310, optionally at Block 312, a transmit beam and receive beam pair can be selected from the multiple transmit beams and the multiple receive beams, based on the signal metric measured for each of the multiple broadcast signals in each of multiple transmit beams, for communicating with the base station. In an aspect, communicating component 242, e.g., in conjunction with processor(s) 212, memory 216, transceiver 202, etc., can select, based on the signal metric measured for each of the multiple broadcast signals in each of multiple transmit beams, a transmit beam and receive beam pair from the multiple transmit beams and the multiple receive beams for communicating with the base station. For example, communicating component 242 can select the transmit beam and receive beam pair based on determining that the transmit beam and receive beam pair has a highest signal metric among the signal metrics for all transmit beam and receive beam pairs. In this example, communicating component 242 can indicate the transmit beam to the base station 102, so the base station 102 can configure the transmit beam for communicating with the UE 104. In another example, communicating component 242 can select the transmit beam and receive beam pair based on reporting the signal metrics to the base station 102 and receiving an indication from the base station 102 of at least which receive beam pair to select.

Figure 5:
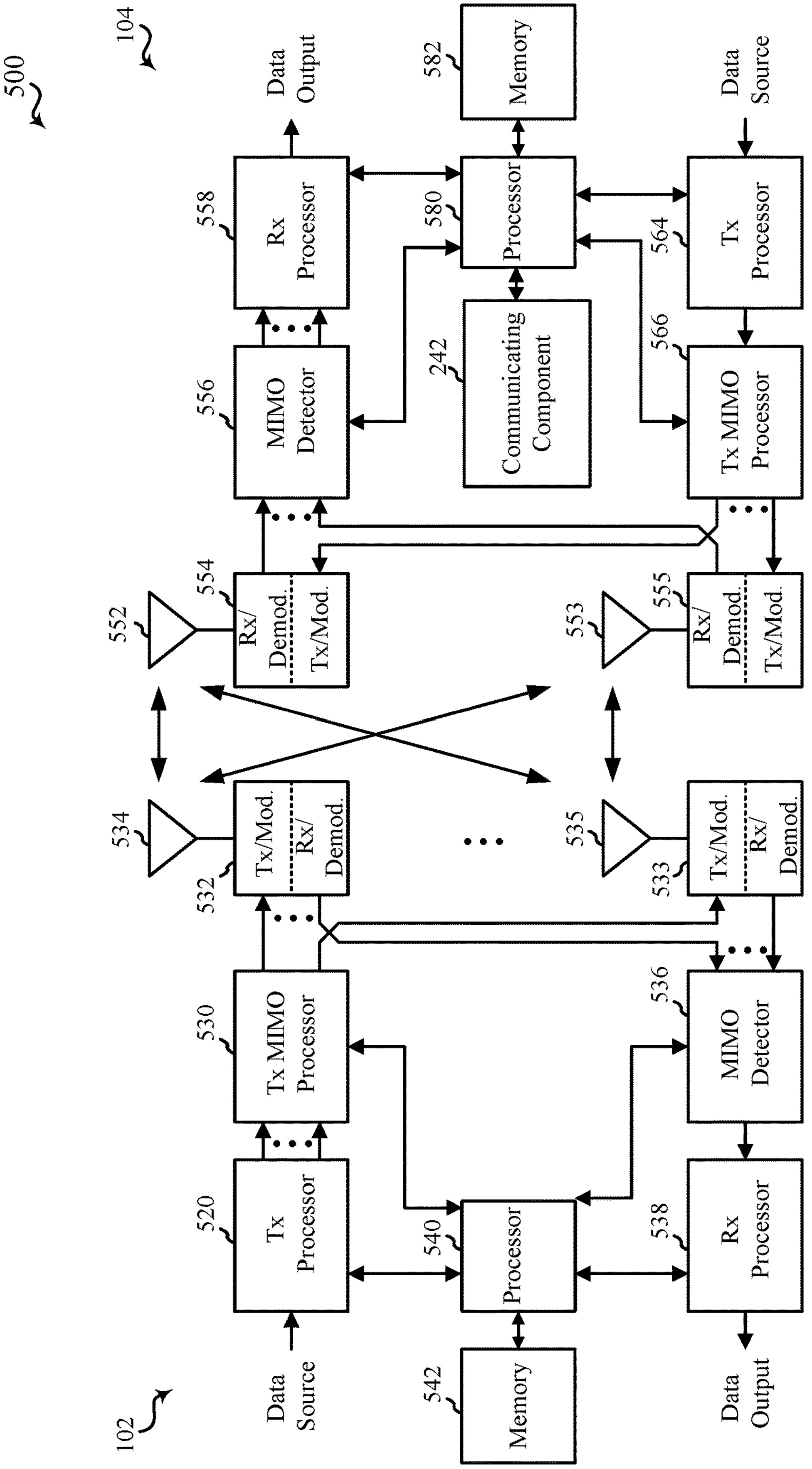
FIG. 5 is a block diagram illustrating an example of a MIMO communication system including a base station and a UE, in accordance with various aspects of the present disclosure.

FIG. 5 is a block diagram of a MIMO communication system 500 including a base station 102 and a UE 104. The MIMO communication system 500 may illustrate aspects of the wireless communication access network 100 described with reference to FIG. 1. The base station 102 may be an example of aspects of the base station 102 described with reference to FIG. 1. The base station 102 may be equipped with antennas 534 and 535, and the UE 104 may be equipped with antennas 552 and 553. In the MIMO communication system 500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 520 may receive data from a data source. The transmit processor 520 may process the data. The transmit processor 520 may also generate control symbols or reference symbols. A transmit MIMO processor 530 may perform spatial processing (e.g., precoding) on data symbols, control symbols, or reference symbols, if applicable, and may provide output symbol streams to the transmit modulator/demodulators 532 and 533. Each modulator/demodulator 532 through 533 may process a respective output symbol stream (e.g., for OFDM, etc.) to obtain an output sample stream. Each modulator/demodulator 532 through 533 may further process (e.g., convert to analog, amplify, filter, and upconvert) the output sample stream to obtain a DL signal. In one example, DL signals from modulator/demodulators 532 and 533 may be transmitted via the antennas 534 and 535, respectively.

The UE 104 may be an example of aspects of the UEs 104 described with reference to FIGS. 1-2. At the UE 104, the UE antennas 552 and 553 may receive the DL signals from the base station 102 and may provide the received signals to the modulator/demodulators 554 and 555, respectively. Each modulator/demodulator 554 through 555 may condition (e.g., filter, amplify, downconvert, and digitize) a respective received signal to obtain input samples. Each modulator/demodulator 554 through 555 may further process the input samples (e.g., for OFDM, etc.) to obtain received symbols. A MIMO detector 556 may obtain received symbols from the modulator/demodulators 554 and 555, perform MIMO detection on the received symbols, if applicable, and provide detected symbols. A receive (Rx) processor 558 may process (e.g., demodulate, deinterleave, and decode) the detected symbols, providing decoded data for the UE 104 to a data output, and provide decoded control information to a processor 580, or memory 582.

The processor 580 may in some cases execute stored instructions to instantiate a communicating component 242 (see e.g., FIGS. 1 and 2).

On the uplink (UL), at the UE 104, a transmit processor 564 may receive and process data from a data source. The transmit processor 564 may also generate reference symbols for a reference signal. The symbols from the transmit processor 564 may be precoded by a transmit MIMO processor 566 if applicable, further processed by the modulator/demodulators 554 and 555 (e.g., for SC-FDMA, etc.), and be transmitted to the base station 102 in accordance with the communication parameters received from the base station 102. At the base station 102, the UL signals from the UE 104 may be received by the antennas 534 and 535, processed by the modulator/demodulators 532 and 533, detected by a MIMO detector 536 if applicable, and further processed by a receive processor 538. The receive processor 538 may provide decoded data to a data output and to the processor 540 or memory 542.

The components of the UE 104 may, individually or collectively, be implemented with one or more ASICs adapted to perform some or all of the applicable functions in hardware. Each of the noted modules may be a means for performing one or more functions related to operation of the MIMO communication system 500. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 500.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for wireless communication, comprising:

receiving, from a base station, multiple transmit beams including, for each transmit beam of the multiple transmit beams, a synchronization signal block (SSB) of multiple broadcast signals transmitted over multiple symbols, wherein the multiple symbols are consecutive, wherein the multiple broadcast signals include two or more of a primary synchronization signal (PSS), a secondary synchronization signal (SSS), or a primary broadcast channel (PBCH), wherein receiving the multiple transmit beams includes, for each transmit beam of the multiple transmit beams, switching among multiple receive beams for each of the multiple symbols to receive a corresponding broadcast signal of the multiple broadcast signals;

measuring a signal metric of each of the multiple broadcast signals as received via a corresponding receive beam of the multiple receive beams in a corresponding symbol of the multiple symbols in each of the multiple transmit beams;

transmitting, to the base station, a report including for each of multiple transmit beam and receive beam pairs, a signal metric, a first identifier of one of the multiple transmit beams used to transmit one of the multiple broadcast signals, and a second identifier of one of the multiple receive beams used to receive the one of the multiple broadcast signals;

receiving, from the base station and based on the report, an indication of at least a receive beam; and selecting, based on receiving the indication from the base station, the receive beam for communicating with the base station.

2. The method of claim 1, wherein the multiple broadcast signals of the multiple transmit beams are received in consecutive symbols.

3. The method of claim 1, wherein the multiple broadcast signals include the PSS, the SSS, and two or more PBCHs.

4. The method of claim 3, wherein receiving each transmit beam including the multiple broadcast signals includes receiving each of the PSS, SSS, and two or more PBCHs using a different receive beam of the multiple receive beams.

5. The method of claim 1, wherein measuring the signal metric includes measuring at least one of a reference signal received power (RSRP), reference signal received quality (RSRQ), received signal strength indicator (RSSI), signal-to-noise ratio (SNR), or signal-to-interference-and-noise ratio (SINR) of each of the multiple broadcast signals.

6. An apparatus for wireless communication, comprising:

a transceiver;

a memory configured to store instructions; and one or more processors communicatively coupled with the memory and the transceiver, wherein the one or more processors are configured to:

receive, from a base station, multiple transmit beams including, for each transmit beam of the multiple transmit beams, a synchronization signal block (SSB) of multiple broadcast signals transmitted over multiple symbols, wherein the multiple symbols are consecutive, wherein the multiple broadcast signals include two or more of a primary synchronization signal (PSS), a secondary synchronization signal (SSS), or a primary broadcast channel (PBCH), wherein receiving the multiple transmit beams includes, for each transmit beam of the multiple transmit beams, switching among multiple receive beams for each of the multiple symbols to receive a corresponding broadcast signal of the multiple broadcast signals;

measure a signal metric of each of the multiple broadcast signals as received via a corresponding receive beam of the multiple receive beams in a corresponding symbol of the multiple symbols in each of the multiple transmit beams;

transmit, to the base station, a report including for each of multiple transmit beam and receive beam pairs, a signal metric, a first identifier of one of the multiple transmit beams used to transmit one of the multiple broadcast signals, and a second identifier of one of the multiple receive beams used to receive the one of the multiple broadcast signals;

receive, from the base station and based on the report, an indication of at least a receive beam; and select, based on receiving the indication from the base station, the receive beam for communicating with the base station.

7. The apparatus of claim 6, wherein the multiple broadcast signals of the multiple transmit beams are received in consecutive symbols.

8. The apparatus of claim 6, wherein the multiple broadcast signals include the PSS, the SSS, and two or more PBCHs.

9. The apparatus of claim 8, wherein the one or more processors are configured to receive each transmit beam including the multiple broadcast signals as each of the PSS, SSS, and two or more PBCHs using a different receive beam of the multiple receive beams.

10. The apparatus of claim 6, wherein the one or more processors are configured to measure the signal metric as at least one of a reference signal received power (RSRP), reference signal received quality (RSRQ), received signal strength indicator (RSSI), signal-to-noise ratio (SNR), or signal-to-interference-and-noise ratio (SINR) of each of the multiple broadcast signals.

11. An apparatus for wireless communication, comprising:

means for receiving, from a base station, multiple transmit beams including, for each transmit beam of the multiple transmit beams, a synchronization signal block (SSB) of multiple broadcast signals transmitted over multiple symbols, wherein the multiple symbols are consecutive, wherein the multiple broadcast signals include two or more of a primary synchronization signal (PSS), a secondary synchronization signal (SSS), or a primary broadcast channel (PBCH), wherein the means for receiving the multiple transmit beams includes means for, for each transmit beam of the multiple transmit beams, switching among multiple receive beams for each of the multiple symbols to receive a corresponding broadcast signal of the multiple broadcast signals;

means for measuring a signal metric of each of the multiple broadcast signals as received via a corresponding receive beam of the multiple receive beams in a corresponding symbol of the multiple symbols in each of the multiple transmit beams;

means for transmitting, to the base station, a report including for each of multiple transmit beam and receive beam pairs, a signal metric, a first identifier of one of the multiple transmit beams used to transmit one of the multiple broadcast signals, and a second identifier of one of the multiple receive beams used to receive the one of the multiple broadcast signals;

means for receiving, from the base station and based on the report, an indication of at least a receive beam; and means for selecting, based on receiving the indication from the base station, the receive beam for communicating with the base station.

12. The apparatus of claim 11, wherein the multiple broadcast signals of the multiple transmit beams are received in consecutive symbols.

13. The apparatus of claim 11, wherein the multiple broadcast signals include the PSS, the SSS, and two or more PBCHs, and wherein the means for receiving receives each of the PSS, SSS, and two or more PBCHs of each transmit beam using a different receive beam of the multiple receive beams.

14. The apparatus of claim 11, wherein the means for measuring the signal metric measures at least one of a reference signal received power (RSRP), reference signal received quality (RSRQ), received signal strength indicator (RSSI), signal-to-noise ratio (SNR), or signal-to-interference-and-noise ratio (SINR) of each of the multiple broadcast signals.

15. A non-transitory computer-readable medium, comprising code executable by one or more processors for wireless communications, the code comprising code for:

receiving, from a base station, multiple transmit beams including, for each transmit beam of the multiple transmit beams, a synchronization signal block (SSB) of multiple broadcast signals transmitted over multiple symbols, wherein the multiple symbols are consecutive, wherein the multiple broadcast signals include two or more of a primary synchronization signal (PSS), a secondary synchronization signal (SSS), or a primary broadcast channel (PBCH), wherein the code for receiving the multiple transmit beams includes code for, for each transmit beam of the multiple transmit beams, switching among multiple receive beams for each of the multiple symbols to receive a corresponding broadcast signal of the multiple broadcast signals;

measuring a signal metric of each of the multiple broadcast signals as received via a corresponding receive beam of the multiple receive beams in a corresponding symbol of the multiple symbols in each of the multiple transmit beams;

transmitting, to the base station, a report including for each of multiple transmit beam and receive beam pairs, a signal metric, a first identifier of one of the multiple transmit beams used to transmit one of the multiple broadcast signals, and a second identifier of one of the multiple receive beams used to receive the one of the multiple broadcast signals;

receiving, from the base station and based on the report, an indication of at least a receive beam; and selecting, based on receiving the indication from the base station, the receive beam for communicating with the base station.

16. The non-transitory computer-readable medium of claim 15, wherein the multiple broadcast signals of the multiple transmit beams are received in consecutive symbols.

17. The non-transitory computer-readable medium of claim 15, wherein the multiple broadcast signals include the PSS, the SSS, and two or more PBCHs, and wherein the code for receiving receives each of the PSS, SSS, and two or more PBCHs for each transmit beam using a different receive beam of the multiple receive beams.

18. The non-transitory computer-readable medium of claim 15, wherein the code for measuring the signal metric measures at least one of a reference signal received power (RSRP), reference signal received quality (RSRQ), received signal strength indicator (RSSI), signal-to-noise ratio (SNR), or signal-to-interference-and-noise ratio (SINR) of each of the multiple broadcast signals.

* * * * *